Aug. 31, 1965  G. P. BAUMANN  3,203,872
SECONDARY BUTANOL PURIFICATION PROCESS
Filed June 23, 1961
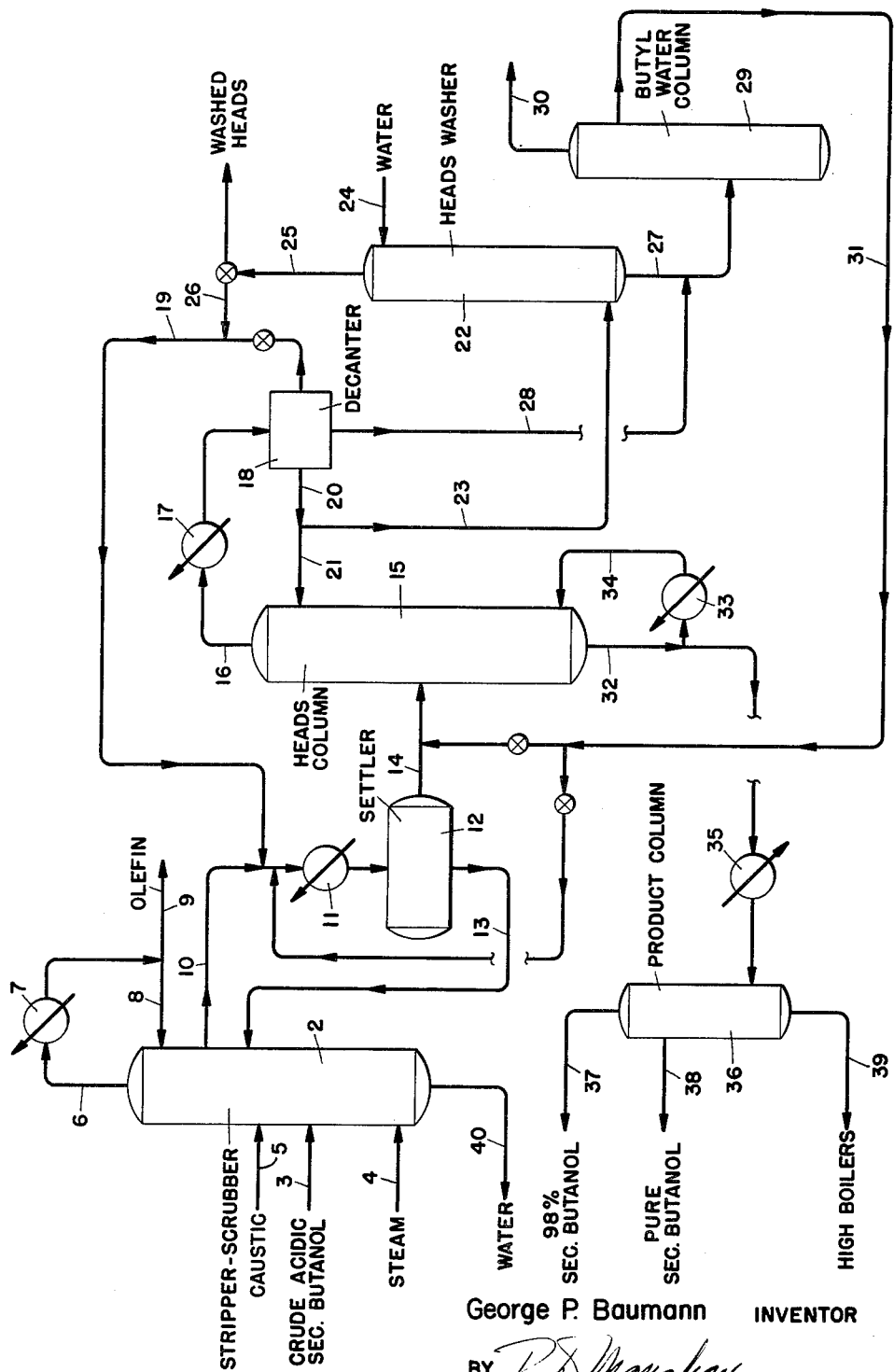
George P. Baumann  INVENTOR
BY R. D. Monahan
PATENT ATTORNEY

United States Patent Office 3,203,872
Patented Aug. 31, 1965

3,203,872
SECONDARY BUTANOL PURIFICATION PROCESS
George P. Baumann, Sparta, N.J., assignor to Esso Research and Engineering Company, a corporation of Delaware
Filed June 23, 1961, Ser. No. 119,212
3 Claims. (Cl. 202—40)

The invention relates to an improved method for purifying secondary butanol. More specifically it concerns the use of heads or washed heads to improve the production of secondary butanol made by hydrating normal butylenes.

In the preparation of secondary butanol from butylenes, the olefin feed, which is essentially free of isobutylene, is absorbed in a 75–80 wt. percent sulfuric acid solution at a slightly elevated temperature and the acid extract is then diluted with water to partially hydrolyze the butyl hydrogen sulfate in the mixture. This alcohol-ester-acid mixture is transferred to a generator wherein the remainder of the ester is hydrolyzed and the alcohol is stripped from the acid and the dilute acid (ca. 45 wt. percent) recovered as bottoms from the generator is reconcentrated and used to absorb more normal butylenes. The alcohol mixture is then introduced into a caustic stripper-scrubber tower which, among other things, neutralizes the entrained acid and acid esters. A side stream containing aqueous secondary butanol is drawn off the tower and after cooling is separated into two phases in a settler. In the conventional process, the alcohol-rich layer (crude butanol) withdrawn from the settler, which contains about 25 to 30 wt. percent water and a small amount of other low boiling substances, is put through a heads column to dry and to remove the lower boiling liquids prior to fractionating it to recover pure, i.e. 98 to 99.5+, product.

It has been found that recycling a part of the heads to the caustic stripper-scrubber side stream markedly changes the composition of the crude butanol layer in the settler and thereby makes it less difficult to purify. For instance, it has been noted that recycling about 5 wt. percent washed heads or about 10% of unwashed heads, based on the side stream, results in a 50% reduction in water in the alcohol layer in the settler. The effect produced is more than the removal of entrained water because both phases in the separator are normally clear.

The more concentrated alcohol stream obtained by recycling a portion of the heads requires less energy to dry. This modification of the process results in over a twofold saving in heat. Alternatively, the advantage obtained by means of this process can be used to increase production rather than save on heat since the burden on the final purification steps is significantly reduced.

The invention will be described with reference to the accompanying drawing which is a flow diagram of the process.

The crude acidic secondary butanol introduced into stripper-scrubber 2 through line 3 is obtained by absorbing a $C_4$ hydrocarbon cut containing about 20 to 80 wt. percent, e.g. 42 wt. percent normal butylenes and 10 to 80 wt. percent, e.g. 50 wt. percent, butanes, the balance being $C_3$ and $C_5$ hydrocarbons, in a concentrated sulfuric acid solution (ca. 75 wt. percent), diluting the acid extract with at least the stoichiometric amount of water at about 160 to 175° F. to hydrolyze the esters in the extract and release secondary butanol, and thereafter passing the mixture through a generator operated at 230 to 300° F. and 20 p.s.i.g. pressure to separate the acid from the released butanol. The crude acidic secondary butanol recovered from the generator is continuously introduced into the stripper-scrubber at a rate of 1000 gallons (U.S.) per hour on a liquid basis and is stripped therein with steam which is passed into the bottom of the stripper-scrubber through line 4 at the rate of 270 gallons per hour on a liquid basis. Concurrently, the alcohol is scrubbed with 20 wt. percent sodium hydroxide solution which is introduced in the upper part of the tower through line 5 at the rate of 45 gallons per hour. The olefins in the crude alcohol mixture are withdrawn together with ethers, alcohols, dimers and some water from the stripper-scrubber through overhead line 6, cooled to 110° F. by means of indirect heat exchanger 7 and about 92% of the cooled overhead stream is returned to the top of tower 2 as reflux through line 8, while the remaining portion of the stream, principally olefins, is withdrawn through line 9. The diluted spent caustic (water) accumulated in the bottom of the stripper-generator is removed through line 40. A crude secondary butanol side stream, from which the last trace of acid has been removed, containing up to 50 wt. percent water and 2 to 5 wt. percent of substances other than secondary butanol is withdrawn from tower 2 via line 10 and is mixed with recycle heads via line 19 and is cooled to 100° F. by means of side stream cooler 11 and introduced into gravity settler 12 wherein there is an upper alcohol phase and a lower water phase. The aqueous layer in settler 12 is continuously withdrawn through line 13 and returned to the stripper-scrubber which is operated at 200–260° F. and a pressure of 18 p.s.i.g. The aqueous phase in the settler consists of about 85 wt. percent water and 15 wt. percent secondary butanol. The alcohol layer in the settler, which is continuously being drawn off through line 14 at the rate of 580 gallons per hour, contains approximately 60 to 80 wt. percent secondary butanol, 5 to 25 wt. percent water and 5 to 25 wt. percent low boilers, including principally di-secondary butyl ether and approximately equal quantities of isopropanol and $C_5$ to $C_8$ hydrocarbons. A typical composition of the stream in line 14 is as follows:

| Component | Typical Composition, Weight Percent | Range, Wt. Percent |
| --- | --- | --- |
| Sec. butyl alcohol | 75.0 | 60–80 |
| Butylenes | 0.4 | 0–2.0 |
| Isopropanol | 0.4 | 0–2 |
| Methylethyl ketone | 0.2 | 0–1 |
| Tert. butyl alcohol | 0.2 | 0–1 |
| Di-sec. butyl ether | 8.6 | 2–20 |
| $C_5$ to $C_8$ Hydrocarbons | 0.3 | 0–1 |
| $C_{8+}$ Hydrocarbons | 0.8 | 0.2–2 |
| Water | 14.0 | 5–25 |

The settled crude butanol is introduced into the heads column 15 which is maintained at a temperature (with the proper amount of heads reflux) which is sufficiently high to remove the impurities boiling lower than the alcohol and carry water overhead in an azeotrope, but low enough to prevent any significant amount of alcohol product from coming off overhead. Usually the temperature of the overhead stream is about 185° F. and the pressure in the heads column is about 2 p.s.i.g. The constant boiling azeotrope containing the low boiling components in the crude alcohol plus the water in the feed withdrawn overhead from the purifying column through line 16 is condensed by means of indirect heat exchanger 17. The liquid condensate is recovered in decanter 18 which contains an upper heads layer and a lower water layer. A sufficient amount, i.e. 10 wt. percent of the alcohol-containing composition in the stripper-scrubber side stream, of the upper layer which consists mainly of secondary butyl ether with $C_4$ to $C_8$ hydrocarbons, $C_3$ to $C_4$ alcohols and secondary butyl alcohol and water, is removed from decanter 18 through an open valve in line 19 and mixed with the crude alcohol in side stream 10. In other words, about 100 gallons per hour of the condensed heads is withdrawn from the decanter and blended with the stripped and scrubbed secondary butanol in the stripper-scrubber side stream prior to introducing it into the settler. The effect of this recycle of a portion of the heads to the dilute alcohol side stream is to substantially change the composition of the alcohol layer in the settler. This small amount of heads, which is soluble in the alcohol, significantly reduces the water content of the alcohol layer.

The amount of the water insoluble heads blended with the crude alcohol in the side stream can be as little as 2 or 3 wt. percent based on the composition in the side stream, or as much as 20 or 25 wt. percent. The amount of heads added to the side stream will depend upon how much heads can be tolerated without significantly interfering with the operation of the heads column. In most instances it will be found that the amount of heads recycled should be between about 5 and 20 wt. percent, based on the side stream.

The remaining portion of the upper layer in decanter 18 is withdrawn through line 20 and divided into two streams. About 310 gallons per hour of the liquid heads is passed into the upper part of the heads column through line 21 as reflux while about 70 gallons per hour are sent to the heads washer 22 via line 23. About 25 gallons per hour of water are introduced near the top of the heads washer through line 24 to remove impurities, such as isopropanol and sec. butanol, from the heads. The washer is operated at 110° F. and over 10 p.s.i.g. pressure. The washed heads are withdrawn from the washer overhead through line 25 and may be used for gasoline blending. Preferably, they can be used in lieu of or in combination with the unwashed heads employed to reduce the water content of the crude alcohol in the side stream. This can be accomplished by adjusting the valve in line 25 so that the washed heads flow through line 26 and into line 19. The extract water collected in the bottom of the heads washer is withdrawn from the bottom of the butyl water column through line 27 and passed into the butyl water column 29 together with the liquid that comprises the aqueous lower layer in the decanter. The water in the bottom of the decanter flows to the butyl water column through lines 28 and 27. The butyl water column is a distillation unit in which the slop solvent, i.e., crude isopropanol, in the water is removed overhead through line 30. The column is operated at about 177 to 230° F. and 2 p.s.i.g. pressure and usually has a steam inlet (not shown) near the bottom to provide means for stripping the organic solvents from the water which is discharged from the tower bottom. The secondary butanol (70%) and some water are withdrawn from a side stream a few trays above the feed tray of the butyl water column through line 31 and recycled to the heads column via line 14, or via line 10 into the settler 12 and then to the heads column.

Dry secondary butyl alcohol is continuously withdrawn as bottoms from heads column 15 through line 32 and a portion is heated to 230° F. by means of an indirect heat exchanger 33 and returned to the bottom of the heads column through line 34. The residue of the bottoms is heated by means of another indirect heat exchanger 35 to 240° F. and introduced near the bottom of products distillation column 36 which has 20 plates. The products column, the overhead stream of which is at approximately the boiling point of the alcohol, is operated at 2 p.s.i.g. pressure and has the function of removing essentially all of the high boiling components from the dry alcohol. The product column is operated so that 40 gallons per hour of 98% secondary butanol is continuously withdrawn overhead through line 37 and pure butanol, i.e., 99.5% is withdrawn through side stream 38 at the rate of 450 gallons per hour. The high boiling impurities in the alcohol withdrawn from the bottoms of the heads column are removed from the product column through line 39.

The secondary butyl alcohol process just described is substantially the same as one of the commercial methods for making the alcohol with the exception that a part of the heads or washed heads is admixed with the crude alcohol prior to removing a portion of the water from it in the gravity settler. This step in the process produces substantial savings in the operation of the secondary butanol unit. Heretofore, it has been suggested that the water content of the secondary butanol could be reduced by using large amounts of caustic soda. This, however, was not feasible because caustic soda is not only a serious contaminant but in order to purge it from the system, it was necessary to also purge about 10 wt. percent of the secondary butyl alcohol in the feed. The present invention provides a simple yet highly effective means of lowering the water content of the dilute alcohol stream and thereby improving the throughput and/or saving on the heat which is otherwise necessary to operate the heads column.

The heads liquid can be added to the secondary butanol-rich side stream either before or after the stream is is cooled. It is preferred, however, to introduce the heads stream prior to cooling the wet alcohol side-stream.

Insofar as the heads themselves are concerned, it is preferred to use washed heads since they have a low water and alcohol content. However, unwashed heads can be used with success. A typical unwashed heads composition is shown below:

*Heads composition*

| Component | Typical Composition, Wt. Percent | Range, Wt. Percent |
|---|---|---|
| Isopropanol | 12 | 0–20 |
| Secondary butanol | 36 | 30–40 |
| Secondary butyl ether+C$_8$ hydrocarbon polymer [1] | 40 | 30–65 |
| Water | 12 | 6–15 |

[1] The weight ratio of ether to polymer is about 4:1. Washed heads consist essentially of the ether.

Resort may be had to various modifications and variations of the present invention without departing from the spirit of the discovery or the scope of the appended claims.

What is claimed is:

1. In a continuous process for purifying a crude acidic secondary butyl alcohol mixture containing alcohol soluble impurities lower boiling than said secondary butyl alcohol, which comprises continuously introducing a stream of crude acidic secondary butyl alcohol into a stripper-scrubber, treating said crude acidic secondary butyl alcohol with caustic and said stripper-scrubber to remove the last trace of any acid and any hydrocarbon in the crude alcohol, withdrawing a crude secondary butyl alcohol liquid side stream from said stripper-scrubber, cooling and passing said side stream to a settler wherein it is separated into an upper alcohol phase containing said lower boiling impurities and a lower aqueous phase, continuously withdrawing the upper alcohol phase from said settler and introducing it into a heads column wherein vapors of the lower boiling impurities and water contained in said upper alcohol phase are taken overhead as an azeotrope, condensing and separating said azeotropic vapor from said heads column into an upper heads liquid layer comprising said lower boiling impurities and a lower aqueous liquid layer, passing a first portion of said heads liquid from said upper layer to the heads column as reflux, and washing a second portion of said heads liquid from said upper layer with water, withdrawing a liquid stream comprising secondary butanol contaminated with higher boiling impurities as bottoms from said heads column, introducing the bottoms stream into a distillation column wherein essentially pure secondary butanol is taken off overhead and as a side stream, and higher boiling impurities are removed as liquid from the bottom, the improvement which comprises continuously admixing a third portion of the heads liquid from said upper layer with the stripper-scrubber side stream.

2. A process according to claim 1, in which the heads liquid admixed with the side stream is washed heads liquid.

3. A process according to claim 1, in which the heads liquid admixed with the side stream is about 5 to 20 wt. percent of the said side stream.

References Cited by the Examiner
UNITED STATES PATENTS

| | | | |
|---|---|---|---|
| 1,873,006 | 8/32 | Merley | 202—40 |
| 2,109,004 | 2/38 | Archibald et al. | 260—641 |
| 2,392,534 | 1/46 | Von Keussler. | |
| 2,487,086 | 11/49 | Amick et al. | |
| 2,582,214 | 1/52 | Twigg | 202—60 X |
| 2,648,711 | 8/53 | Carrier | 260—641 X |
| 2,806,816 | 9/57 | Staib et al. | 260—643 |
| 2,809,927 | 10/57 | Staib. | |
| 2,875,138 | 2/59 | Altreciter et al. | |

NORMAN YUDKOFF, *Primary Examiner.*

GEORGE D. MITCHELL, MILTON STERNMAN,
*Examiners.*